United States Patent [19]

Bay et al.

[11] Patent Number: 4,976,399
[45] Date of Patent: Dec. 11, 1990

[54] SPACECRAFT CONNECTOR

[75] Inventors: Peter M. Bay, Germantown; Carmine J. Colaluca, Jr., Derwood; Steven Pataki, Silver Spring, all of Md.

[73] Assignee: Fairchild Space and Defense Corporation, Germantown, Md.

[21] Appl. No.: 301,931

[22] Filed: Jan. 26, 1989

[51] Int. Cl.⁵ .............................................. B64G 1/64
[52] U.S. Cl. .................................................. 244/161
[58] Field of Search ................... 244/161, 135 A, 115; 114/250, 249; 403/50, 51; 285/226, 114

[56] References Cited

U.S. PATENT DOCUMENTS

| | | | |
|---|---|---|---|
| 3,201,065 | 8/1965 | Dunn | 244/161 |
| 3,753,536 | 8/1973 | White | 244/161 |
| 4,195,804 | 4/1980 | Hujsak | 244/161 |
| 4,500,057 | 2/1985 | Duwelz | 244/161 |
| 4,588,150 | 5/1986 | Bock et al. | 244/161 |
| 4,809,936 | 3/1989 | Whitaker | 244/161 |

Primary Examiner—Galen Barefoot
Attorney, Agent, or Firm—Michael W. York

[57] ABSTRACT

A spacecraft connector for making an electrical or similar connection with a spacecraft. The connector has on board portion that is attached to or forms part of the spacecraft and an externally located portion. Both the on board portion and the spacecraft portion have paired hook shaped portions that are adapted to contact each other in a manner that permits the connection and disconnection of the connector. The connectors provide an interface without exerting undue forces upon the spacecraft.

9 Claims, 4 Drawing Sheets

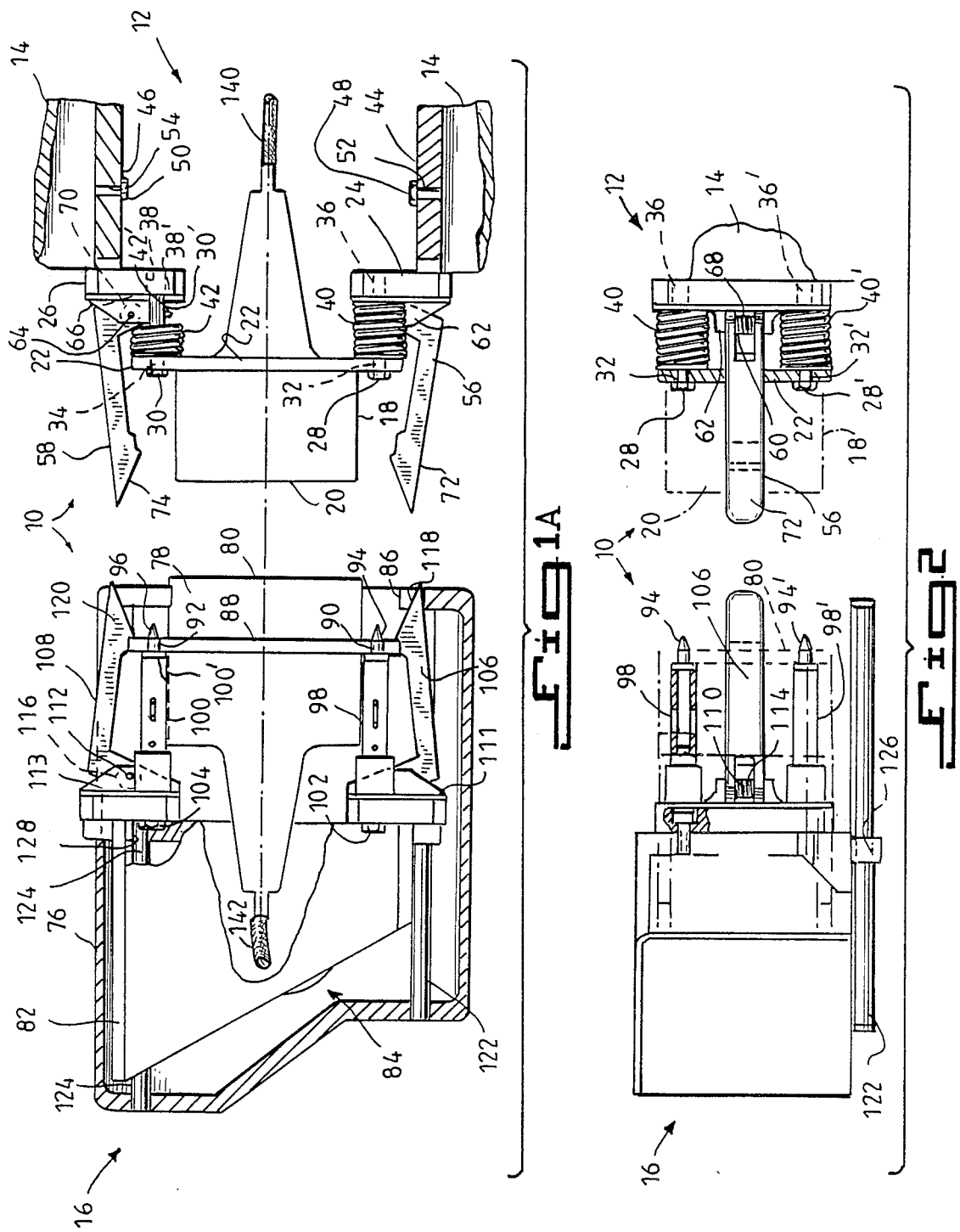

SPACECRAFT CONNECTOR

BACKGROUND OF THE INVENTION

Spacecraft can have their usefulness extended during launch and orbital operations through the use of a remateable umbilical mechanism and berthing platforms. Such platforms permit the retrieved spacecraft to dock with the Space Transportation System (STS) to obtain necessary replenishment of electrical power, fuel and the like.

In order to accomplish this, the in orbit retrieved spacecraft is required to be attached to the berthing platform or to the STS cargo bay for launch durations in order to transfer propellant (fuel), electrical power, etc., from the berthing platform to the spacecraft or to transfer information from the spacecraft to the platform. This connection is commonly called an umbilical connector, and the connection is made with the spacecraft through what is commonly referred to as an umbilical drive mechanism.

Current umbilical drive mechanisms result in what is commonly termed a rigid umbilical connection between the berthing platform or STS structure and the umbilical connector on the spacecraft. With such a rigid connection, a force is exerted on the spacecraft through the umbilical drive mechanism if or when relative displacements occur between the launch vehicle and spacecraft. Such a force may be acceptable when the connection is made during in orbit operations with the berthing platform since the load transfer from the berthing platform or STS is nonexistent, or at best minimal.

This type of so called rigid connection is not acceptable during the STS launch regime when high mechanical loads may be imparted to the spacecraft. This is due to the fact that unacceptable deflections or movements between the spacecraft and the STS or berthing platform or the like that support the umbilical drive mechanism will result in this situation.

A berthing platform is not available during many actual or contemplated spacecraft operations where an umbilical connection with the spacecraft is necessary or desirable. This is true, for instance, during launch or in general during operations occurring other than in orbit where docking with a berthing platform is contemplated. Consequently, a definite need exists for a spacecraft connector that can make a connection with a spacecraft without exerting any forces upon the spacecraft. The desired connection is termed "a soft umbilical connection" and is defined as the result of decoupling the mechanical drive mechanism from the umbilical connectors after mating has been accomplished.

This invention fulfills this need and allows a satisfactory connection to be made with the spacecraft at most if not all of the times it may be desired. This connection is made through the use of this invention.

BRIEF DESCRIPTION OF THE INVENTION

This invention relates to vehicle connectors for making an external connection with a vehicle and more particularly to connectors for spacecraft.

It is therefore an object of the invention to provide a spacecraft connector that makes a satisfactory external connection with the exterior of the spacecraft.

It is an object of the present invention to provide a spacecraft connection that does not exert any unopposed force upon the spacecraft after the connection is made between the launch vehicle mounted connector and the spacecraft mounted connector.

It is an object of the invention to provide a spacecraft connector that does not require the use of a berthing platform or the like.

It is also an object of the invention to provide a spacecraft connection that does not result in any mechanical load transfer between the launch vehicle and the spacecraft and to provide a compliant interface which accommodates deflections resulting from bulk temperature changes and relative motions between the spacecraft and launch vehicle structures.

It is also an object of the invention to provide a spacecraft connector that can be mated and unmated repeatedly during launch and in orbit prior to spacecraft orbital injection.

It is a further object of the invention to provide a spacecraft connector that provides what is termed a "soft mating" with the spacecraft.

It is also an object of the invention to provide a spacecraft connector that is capable of being utilized successfully during launching of the spacecraft via the space transport system; e.g., the space shuttle.

These and other objects are provided by the spacecraft connector invention that includes a connector portion that is located on or forms part of the spacecraft and another connector portion that is located externally from the spacecraft. The externally located portion is driven by suitable drive means in order that the externally located portion can be connected to the connector portion that is located on or forms part of the spacecraft. The spacecraft connector includes means for not exerting any unopposed forces upon the spacecraft while the connector is being connected and/or while it is being unconnected.

BRIEF DESCRIPTION OF THE DRAWINGS

The invention will be hereinafter more fully described with reference to the accompanying drawings in which:

FIG. 1A is a top plan view of the spacecraft connector invention when it is fully unmated;

FIG. 2 is a side elevational view of the spacecraft connector illustrated in FIG. 1A;

DETAILED DESCRIPTION OF THE PREFERRED EMBODIMENT

Figure 1B:
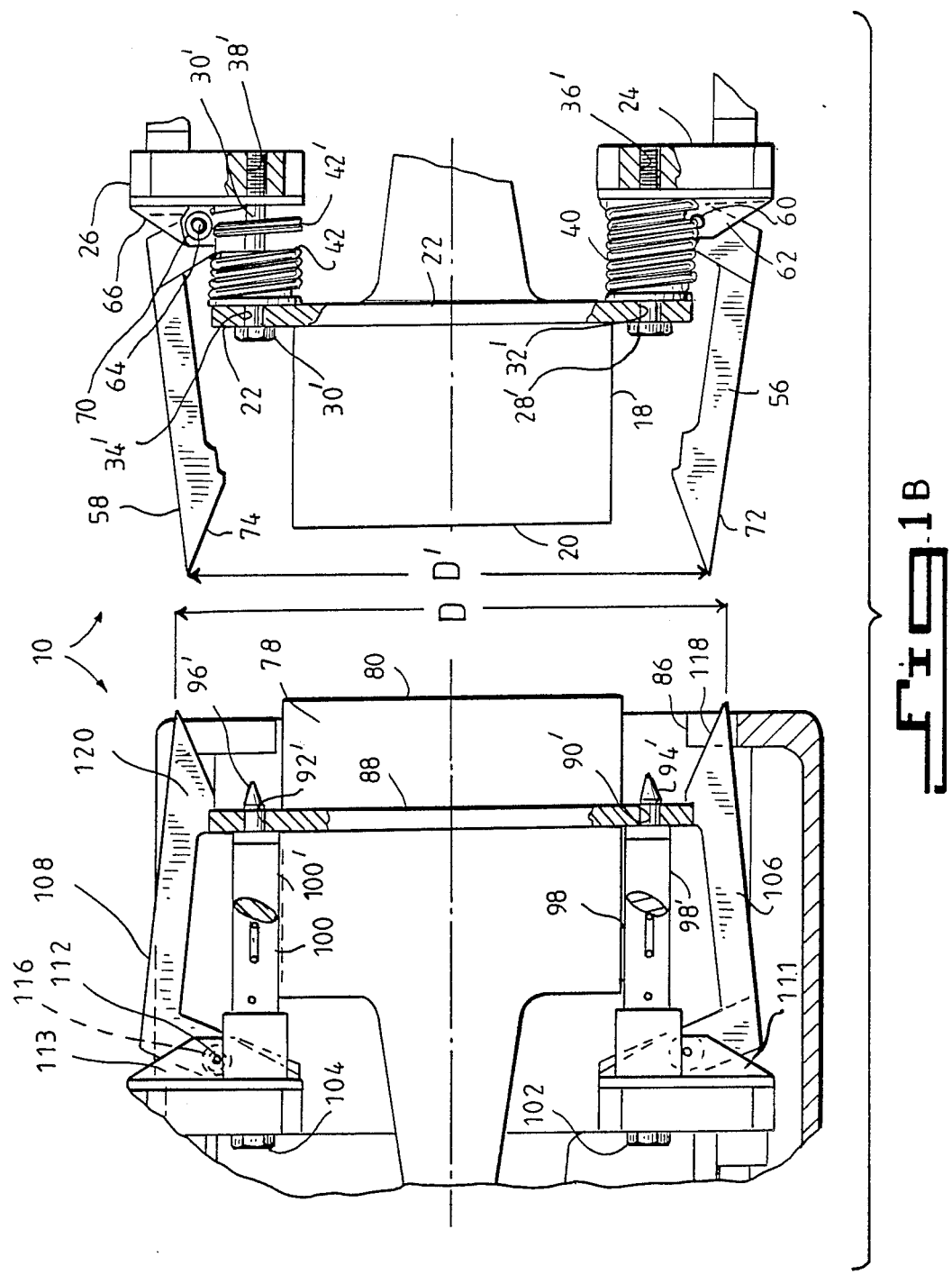
FIG. 1B is an enlarged view of a portion of the structure set forth in FIG. 1A with certain portions broken away for clarification.

Referring first to FIGS. 1A, 1B and 2, the connector invention is illustrated and is designated generally by the number 10. The spacecraft connector 10 comprises an on board connector assembly 12 that is connected to and forms part of the spacecraft 14 and an external connector assembly 16 that is located exterior from and does not form part of the spacecraft 14. The two connector assemblies 12 and 16 are adapted to work together to form suitable connections with and disconnections from the spacecraft 14 in a manner that will be hereinafter described in detail.

The on board connector assembly 12 comprises a male type on board electrical connector member 18 that has a female type electrical connector insert 20 secured within it. The connector 18 has a flange 22 located around its circumference that is used to connect the male connector 18 to two generally rectangular shaped mounting members 24 and 26 by two sets of bolts 28, 28' and 30, 30' that are located in the respective holes 32, 32' and 34, 34' in the flange 22 and threaded into appropriate threaded apertures 36, 36' and 38, 38' in the respective mounting members 24 and 26. Shock absorbing means comprising respective compression springs 40, 40' and 42, 42' are located around the respective bolts 28, 28' and 30, 30' between the flange 22 and the respective mounting members 24 and 26. These springs 40, 40' and 42, 42' absorb the shock that the connector 18 and its insert 20 receive as the connector 18 is being connected.

As shown in FIGS. 1A and 2, each mounting member 24 and 26 has a rearward extending projection designated respectively by the numbers 44 and 46. These members 44 and 46 are used to connect the on board connector assembly 12 to the spacecraft 14 by bolts or the like such as the respective bolts 48 and 50 that are located in the respective holes 52 and 54. Each mounting member 24 and 26 also has a hinged latch clamp or hook member designated respectively by the numbers 56 and 58 rotatably mounted on it. The latch clamp 56 is rotatably mounted to the mounting member 24 since its inner end portion is rotatably mounted by a pivot pin 60 to a projection 62 that extends outward from and is connected to the mounting member 24. In a similar manner the inner end portion of the latch clamp 58 is rotatably connected by a pivot pin 64 to a projection 66 that is connected to and extends outward from the mounting member 26. Each latch clamp 56 and 58 is biased in an inward direction or toward each other by the respective coil springs 68 and 70. These coil springs 68 and 70 exert respective outward forces between the outer surface of the mounting member 24 and the inner surface of the latch clamp 56 and between the outer surface of the mounting member 26 and the inner surface of the latch clamp 58. It will be noted that the latch clamps 56 and 58 both have respective hook shaped outer end portions 72 and 74.

As illustrated in FIGS. 1A, 1B and 2 external connector assembly or umbilical connector assembly 16 comprises a substantially rectangular shaped hollow housing 76 and a female connector receptacle 78 with a male electrical insert 80, a connector conveying and locating member 82 and drive apparatus 84 that are all located within the housing 76. The housing 76 has an aperture 86 in its outer end that is sized and shaped to receive the outer end portion of the female connector receptacle 78 and its electrical insert 80. The receptacle 78 has a flange 88 located around its exterior, and two sets of holes 90, 90' and 92, 92' are provided in the flange 88 that receive the outer portions of the respective tapered guide pins 94, 94' and 96, 96'. The inner portions of these guide pins 94, 94' and 96, 96' are rigidly secured by means known in the art to the outer end portions of the respective guide projections 98, 98' and 100, 100' that are connected by the bolts such as the bolts 102, and 104 to the connector conveying and locating member 82 which is in turn operatively connected to the drive apparatus 84.

Two latch clamp members 106 and 108 that are similar to the latch clamps 56 and 58 are pivotally mounted to the connector conveying and locating member 82 by means of the respective pivot pins 110 and 112 that pivotally connect the inner end portion of the latch clamps 106 and 108 to projections 111 and 113 that extend outward from the outer surface of the connector conveying and locating member 82. These latch clamps 106 and 108 are biased inwardly or toward each other by respective coil springs 114 and 116 that are located around the respective pins 110 and 112 and the latch clamps 106 and 108 have respective hook shaped outer portions 118 and 120 that are substantially identical to the previously mentioned outer portions 72 and 74.

The connector conveying and locating member 82 is slidably mounted within the housing 76 on the generally cylindrical guide rods 122 and 124 that are rigidly connected to the housing 76 and pass through the respective apertures 126 and 128 in the connector conveying and locating member 82. The location of the connector conveying and locating member 82 and the associated connector receptacle 78, its insert 80, and the latch clamps 106 and 108 are governed by the operation of the drive apparatus 84 that is connected to the connector conveying and locating member 82.

Figure 3:
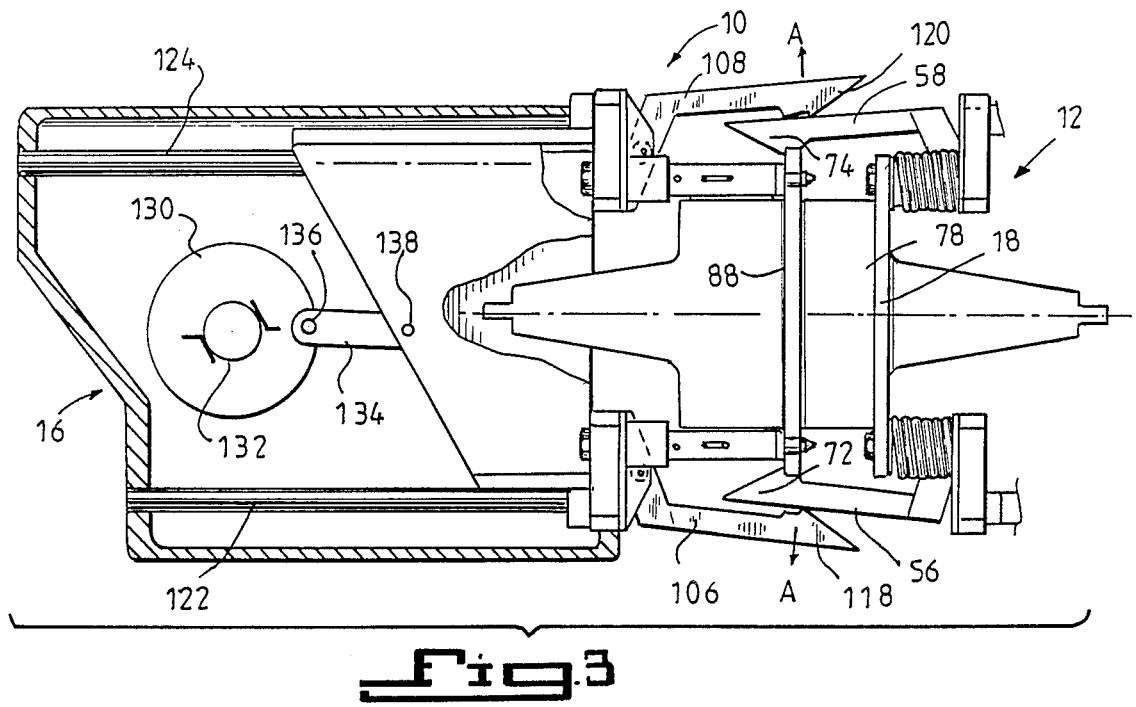
FIG. 3 is a top plan view of the spacecraft connector illustrated in FIGS. 1A, 1B, and 2 as it is being connected or moved to its connected position.

The details of the drive apparatus are best illustrated in FIG. 3. As illustrated, the drive apparatus 84 comprises a substantially flat circular wheel 130 that is mounted on the rotatable shaft 132 that is in turn connected to an electric motor 132 that rotates the wheel 130 when the motor 132 is activated or turned on. The drive apparatus 84 also comprises an elongated push rod member 134 that has one end pivotally connected to the outer circumferential position of the wheel 130 by the pivot pin 136 and the other end pivotally connected to the connector conveying and locating member 82 by the pivot pin 138. In view of this arrangement, when the wheel 130 is rotated this exerts forces upon the elongated push rod member 134 that either push or pull the connector conveying and locating member 82 along the guide rods 122 and 124.

As best illustrated in FIGS. 1A and 3 the respective connector assemblies 12 and 16 are connected to electrical cables designated by the respective numbers 140 and 142. These electrical cables 140 and 142 are electrically connected respectively to the female type insert 20 and the male electrical insert 80 to establish an electrical circuit path or paths to these connector inserts 20 and 80.

The operation or use of the connector 10 is best understood by referring to FIG. 1A and then FIGS. 3 through 6 in sequence. FIG. 1A illustrates the connector invention 10 in its demated or unconnected configuration when the associated spacecraft 14 is located away from a docking platform or the like (not shown). As illustrated in FIG. 1A when the invention 10 is in this unmated configuration, the on board connector assembly portion 12 and the external connector assembly portion 16 are not connected or touching each other.

Then when the spacecraft 14 is appropriately located on a docking platform or the like, the connector 10 is then made to assume the configuration illustrated in FIG. 3 where the connector 10 is illustrated in the process of being mated. The connector 10 is made to assume this configuration by maneuvering the spacecraft 14 in such a manner that the on board connector assembly 12 is axially aligned with the external connector assembly 16. Alternatively, this can be accomplished by moving the external connector assembly 16 so that it is in axial alignment with the on board connector assembly 12 and by moving both the external and the on board connector assemblies 12 and 16. Next the electrical motor 132 is activated by operating a suitable switch (not shown) so that electrical current causes the motor 132 to run, which in turn causes the connected wheel 130 to rotate, which causes the connected push rod member 134 to be pushed outward or to the right as seen in FIG. 3. This also causes the connector conveying and locating member 82 to be pushed outward or to the right by the connected push rod member 134.

Since the connector conveying and locating member 82 is pushed outward or to the right as illustrated in FIG. 3, this also causes the connected connector receptacle 78 and its insert 80 to be moved outward or to the right and also the connected latch clamps 106 and 108 are moved outward or to the right. As illustrated in FIG. 3, when the latch clamps 106 and 108 are moved outward, their respective outer hook shaped portions 118 and 120 are moved outward as indicated by the arrows A, since they come into contact with the outer surface of the respective outer hook shaped portions 72 and 74 of the respective latch clamps 56 and 58 associated with the on board connector assembly 12.

When the latch clamps 106 and 108 move outward as indicated by the arrows A, their respective hook shaped portions 118 and 120 are disengaged from the flange 88 of the receptacle 78 thus freeing the receptacle 78 and its insert 80 from the external connector assembly 16. At the same time this is occurring, the insert 80 is pressed on to the receptacle 20 of the connector 18 so that they are in the connected position illustrated in FIG. 3 where it can be seen that the flange 88 of the receptacle 78 is engaged by the hook shaped portions 72 and 74 of the respective latch clamps 56 and 58.

Figure 4:
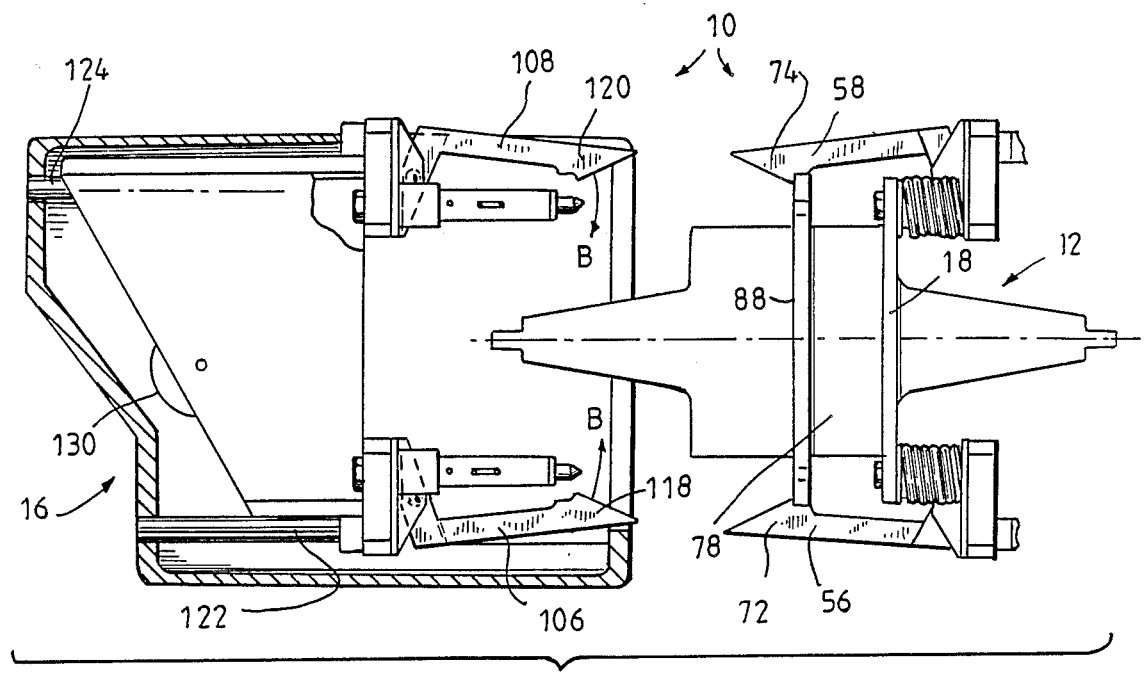
FIG. 4 is a top plan view of the spacecraft connector illustrated in FIGS. 1A through 3 with the connector in its mated position.

Next, the connector conveying and locating member 82 is pulled inward or to the left as illustrated in FIG. 4. This results in the hook shaped portions 118 and 120 of the respective latch clamps 106 and 108 moving out of contact with the hook shaped portion 72 and 74 of the respective latch clamps 56 and 58. The hook shaped portions 118 and 120 also move inward toward each other as indicated by the arrows B in FIG. 4. When this occurs, the insert 80 remains fully inserted into the receptacle 20 of the connector 18 so that they are connected and also the flange 88 of the receptacle 78 remains engaged by the hook shaped portion 72 and 74 of the respective latch clamps 56 and 58. Consequently, the spacecraft connector 10 is in its fully mated position. With the spacecraft connector 10 in this position electrical power or the like can be fed from the cable 142 through the connector insert 80 and into the receptacle 20 and then through the cable 140 that is on board the spacecraft.

Figure 5:
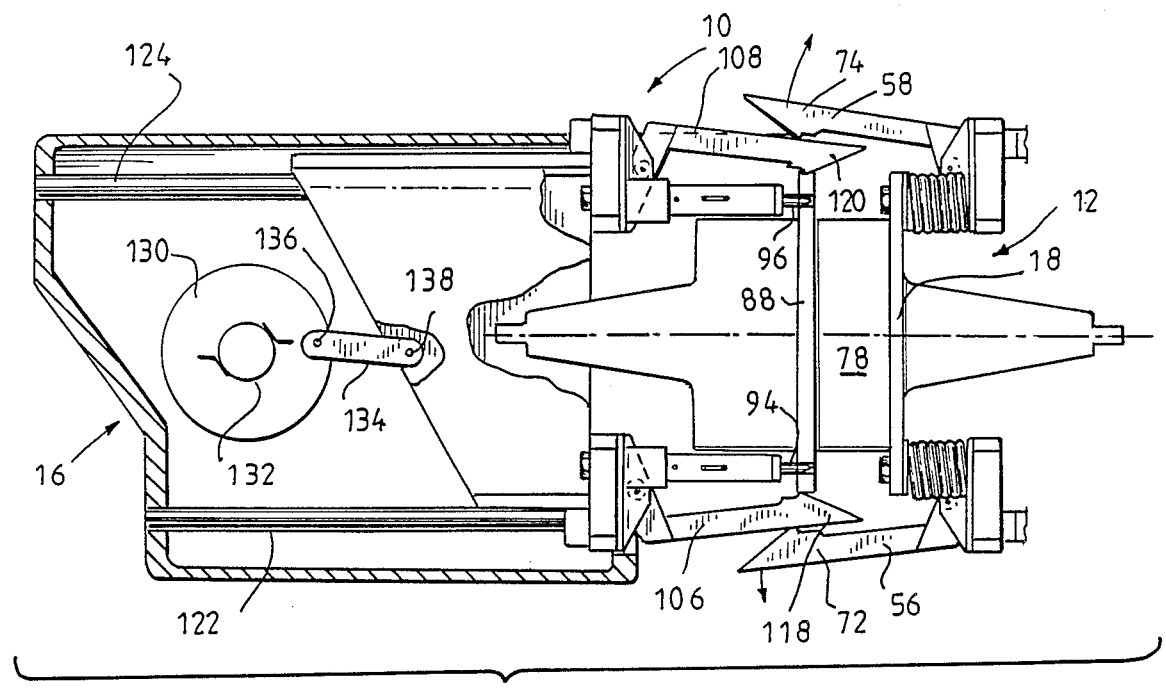
FIG. 5 is a top plan view of the spacecraft connector illustrated in FIGS. 1A through 4 with the spacecraft connector as it is moving into position to disconnect the connector from the spacecraft.

When it is desired to disconnect the connector insert 80 from the receptacle 20, the motor 132 is energized to suitably rotate the wheel 130 to cause the connected push rod member 134 to push the connector conveying and locating member 82 to be pushed outward or to the right as illustrated in FIG. 5. As this occurs this also causes the connected receptacle 78 and its insert 80 to be moved outward or to the right as are the connected latch clamps 106 and 108 whose respective outer hook shaped portions 118 and 120 contact the inner sloping surfaces of the respective outer hook shaped portions 72 and 74 of the respective latch clamps 56 and 58 and pushes them outward and out of the way. It will also be noted that the guide pins 94, 94' and 96, 96' are entering the respective holes 90, 80' and 92, 92' and also the inner portions of the hooked shaped outer portions 118 and 120 are about the slip over the flange 88.

Figure 6:
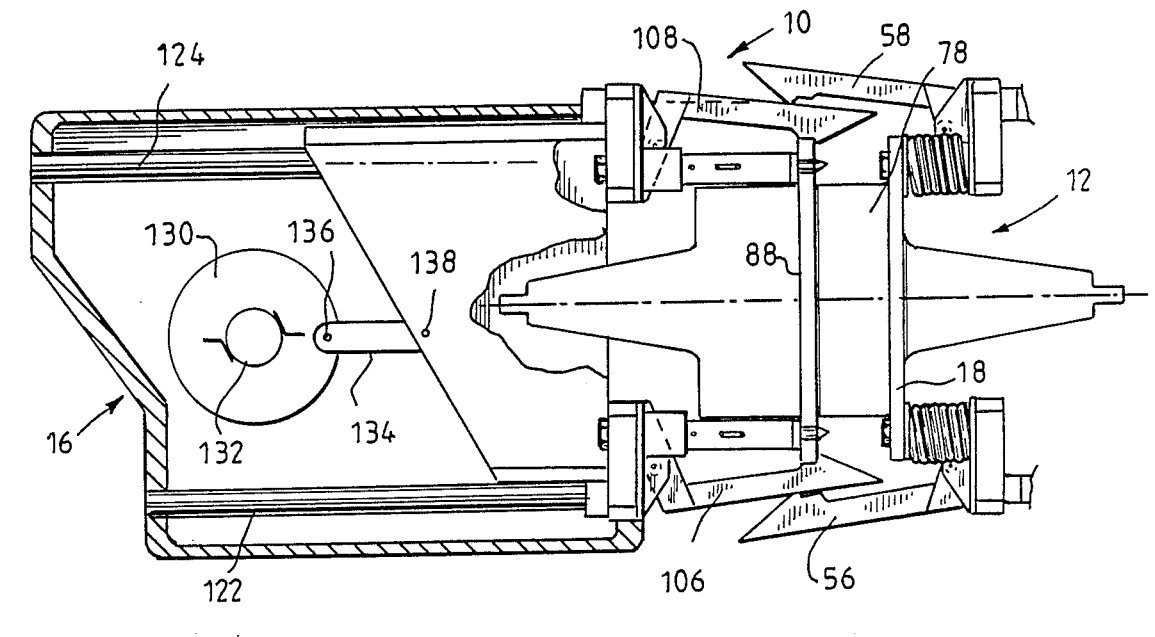
FIG. 6 is a top plan view of the spacecraft connector illustrated in FIGS. 1A through 5 with the spacecraft connector in position for being unconnected or unmated from the spacecraft.

As illustrated in FIG. 6, the continued operation of the motor 132 results in further rotation of the wheel 130 and outward movement as to the right in FIG. 6 of the receptacle 78, the guide pins 94, 94' and 96, 96' and the latch clamps 106 and 108. As a result the outer hook shaped portions 118 and 120 of the respective latch clamps 106 and 108 slip over and engage the flange 88. At the same time the guide pins 94, 94' and 96, 96' enter the respective holes 90, 90' and 92, 92' in the flange 88. The continued operation of the motor 132 results in further turning of the wheel 130 and this results in the pulling of the connected push rod member 134 inward which also pulls on the connector conveying and locating member 82. This also results in the pulling inward, or to the left as illustrated in FIG. 1, of the receptacle 78 and the insert 80 since the outer end portions 118 and 120 of the respective latch clamps 106 and 108 have engaged the flange 88. This results in the receptacle 78 assuming the position illustrated in FIG. 1A where the connector 10 is in its unconnected or demated position.

It will be understood that this sequence for the connector 10 illustrated in FIG. 1A and then FIGS. 3 through 6 and then FIG. 1A again can be and is intended to be repeated. For instance this would occur if the external connector assembly 16 formed part of a space section or the like (not shown) and the on board connector assembly 12 was part of a space vehicle 14 that periodically docked with the space station.

It will be noted that in view of the construction of the connector 10, no force is exerted upon the spacecraft or vehicle 14 during the connection and disconnecting operations set forth in FIG. 1A and FIGS. 3 through 6 that were previously described.

In the preferred embodiment the metal portions of the connector 10 are made from suitable high strength aluminum or titanium through suitable machining or by casting and then machining in a manner known to those skilled in the art. The non-metal or partially metal structures such as the connector 10 inserts 20 and 80 are made from suitable conductors and nonconductor materials in a manner well known to those skilled in the art. The connector 10 is also assembled in a conventional manner well known to those skilled in the art. Although the connector 10 is illustrated and described in connection with making an electrical connection it will be apparent that it may also be used to make other suitable connectors such as those involving a fuel. It will be noted, as best illustrated in FIG. 1B, that the connector 10 must be constructed so that when the connector 10 is in its unconnected configuration or not mated to the spacecraft 14 that the distance D between the outer tips of the end portions 118 and 120 of the respective latch clamps 106 and 108 connected to the conveying and locating member 82 which is not connected to the spacecraft 14 is greater than the distance D' between the outer tips of the end portions 72 and 74 of the clamps 56 and 58 that are connected to the spacecraft 14. This is necessary to have the tips of the outer portions 72 and 74 push the outer portions 118 and 120 outward as illustrated in FIG. 3 when the connector 10 is being mated or connected.

Although the invention has been described in considerable detail with reference to a preferred embodiment, it will be understood that variations may be made within the spirit and scope of the invention as defined in the appended claims.

What is claimed is:

1. Spacecraft connecting apparatus for connecting and disconnecting a removable connecting member to and from a spacecraft comprising a first connector portion located on a spacecraft and a second connector portion locatable externally from said spacecraft, said first connector portion comprising an on board connecting member, at least a pair of separated rotatably mounted clamp members and means operatively associated with said clamp members for biasing said clamp members toward each other, said second connector portion comprising a removable connecting member, securing means associated with said removable connecting member for use in securing said removable connecting member in its connected or disconnected position, at least a pair of rotatably mounted second connector portion clamp members, means operatively associated with said second connector portion clamp members for biasing said second connector portion clamp members toward each other and means operatively connected to said removable connecting member for moving said removable connecting member toward the on board connecting member of said first connector portion, said first connector portion clamp members and said second connector portion clamp members having outer end portions sized and shaped to engage the securing means associated with said removable connecting member and to be disengaged from the securing means by engagement with the end portions of the clamp members of the other connector portion when said removable connecting member is moved toward the on board connecting member of said first connector portion by said means for moving said removable connecting member.

2. The spacecraft connecting apparatus of claim 1 further comprising shock absorbing means associated with said on board connecting member for absorbing shock received by the on board connecting member.

3. The spacecraft connecting apparatus of claim 2 wherein said shock absorbing means comprises at least one spring.

4. The spacecraft connecting apparatus of claim 3 wherein said at least one spring comprises a plurality of springs.

5. The spacecraft connecting apparatus of claim 4 wherein said springs comprise compression springs.

6. The spacecraft connecting apparatus of claim 1 wherein the securing means associated with said removable connecting member comprises a projection on said removable connecting member.

7. The spacecraft connecting apparatus of claim 6 wherein the projection on said removable connecting member comprises a flange.

8. The spacecraft connecting apparatus of claim 7 wherein said second connector portion further comprises a plurality of guide pins and wherein the flange of said removable connecting member has holes for receiving said guide pins.

9. The spacecraft connecting apparatus of claim 1 wherein the outer end portions of the pair of said first connector portion clamp members and the pair of said second connector portion clamp members have tips and wherein the tips of the first connector portion clamp members and the tips of the second connector portion clamp members are positioned to cause the distance between the tips of the second connector portion clamp members to be greater than the distance between the tips of the first connector portion clamp members when the spacecraft connecting apparatus is in its unconnected configuration.

* * * * *